Patented Aug. 18, 1931

1,819,354

UNITED STATES PATENT OFFICE

ABRAHAM SIDNEY BEHRMAN, OF CHICAGO, ILLINOIS, ASSIGNOR TO GENERAL ZEOLITE COMPANY, OF CHICAGO, ILLINOIS, A CORPORATION OF ILLINOIS

MATERIAL PREPARATION

No Drawing.   Application filed August 15, 1928.   Serial No. 299,871.

This invention relates to an improvement in the manufacture of materials adapted to be utilized in the treatment of fluids, and it particularly relates to the preparation of porous siliceous materials to be utilized as absorbents, catalysts or agents for causing chemical changes in fluids.

The process of this invention is especially directed to drying siliceous gels or jellies with warm or hot gases of such composition as to improve materially the character of the final dried material. The siliceous gels or jellies which are dried, according to the process of this invention, may be prepared in a wide variety of ways. If it is desired to produce an adsorbent silica gel, a solution of sodium silicate may be treated with an acid and the gel formed in an acid medium. Or a coloidal solution of silicic acid may be treated with ammonium hydroxide or another alkali to form the gel in an alkaline or neutral medium. These siliceous materials may also be prepared according to the processes described in Patent No. 1,515,007 and in co-pending applications, Serial Nos. 700,822, 708,672 and 46,890. In this patent and these applications, a solution of silicic acid or a compound thereof, such as sodium silicate, is treated with an alkaline material or with a solution of an amphoteric metal to form a gel. As a general rule, the temperatures, proportions and concentrations are so regulated that a gel embracing a major portion, or substantially all, of the reaction mixture will be formed. The proportions of the reagents may also be regulated so that the final reaction mixture, in which the siliceous gel material is formed, will be alkaline or acid to phenolphthalein or methyl orange.

These gels or jellies, as formed, contain large quantities of moisture and soluble impurities, which must be removed. The moisture is preferably removed by drying, while the soluble impurities are preferably removed by washing. It is to the drying operation that the present invention is particularly directed. The gels or jellies may be dried immediately after formation, or they may first be partially or totally washed free of soluble constituents. They may also be dried partially, then washed, and again dried. Many variations may be made in these combined washing and drying operations, dependent upon the result which it is desired to obtain, and upon the particular product which is to be treated.

An object of this invention is to provide an improved process of drying gels and jellies.

Another object of this invention is to provide an improved process of drying gels or jellies, during which the chemical character of the gels or jellies will be advantageously affected.

In the preferred process of the present invention, a gel or jelly is dried with a warm or hot gas containing small amounts of a desirable chemical treating agent in vapor or gaseous condition. Some of the chemical treating agents which may be utilized are carbon dioxide, sulphur dioxide, ammonia, hydrogen sulphide, hydrogen, carbon monoxide, methane or other gaseous hydrocarbons, etc. These gaseous reagents are mixed with hot or warm drying gases. These latter are usually inert in character, but if desirable, may also be of such character as to affect advantageously the gel or jelly material. The concentration of the chemical reagent and the temperature at which it is contacted with the gel or jelly material are so regulated that a desirable velocity and amount of chemical reaction will take place. If it is desirable to produce a neutral dry gel from a siliceous gel which has been produced in an acid medium, an alkaline reagent, such as ammonia, may be added to the drying gases. If, on the other hand, it is desirable to produce a neutral dry gel from a siliceous gel or jelly, which has been produced in an alkaline medium, the gel as formed, or in completely or partially washed condition, may be treated with a drying gas containing quantities of acidic gases, such as carbon dioxide or sulphur dioxide. If it is desirable to reduce certain constituents of a gel or to prevent oxidation of a gel during the drying operation, a drying gas containing quantities of hydrogen and/or carbon monoxide may be utilized. However, if the gel will be improved by keeping it in an oxidizing atmosphere, an oxygen-containing drying gas, such as air, may be utilized.

As a specific example of the present invention, to which it is by no means restricted, the drying of an alkaline gel with hot or warm gas containing a small quantity of acidic gases will be described. An alkaline gel may be produced by treating a solution of sodium silicate with an excess of an acid, and then treating the reaction mixture with an excess of ammonium hydroxide. Or it may be prepared by treating a solution of sodium silicate with an acid or alkaline solution of an amphoteric metal. The resulting gel or jelly may then be washed, compressed, and/or subjected to a process of exudation to remove a portion of its soluble constituents. If desirable, however, the gel or jelly as formed may be immediately subjected to the drying process. The gels thus formed will frequently contain between 85 and 95% of water, and it is often economically desirable to remove a large portion of this water by some means other than by drying. A satisfactory dewatering method consists of subjecting the gel to hydraulic compression until between 40 to 70% of its moisture content has been removed.

The gel or jelly, which may or may not have been first partially dewatered or freed of its soluble constituents, is then broken up, if not already in that condition, and is placed on horizontal trays, preferably in layers about ½" thick. If desired, the depth of the layer may be as much as 3", but preferably it does not exceed 4". A current of warm or hot air, preferably ranging from 40° C. to 100° C, and containing small quantities of carbon dioxide, is then passed over the layer of gel material for a period ranging from 24 hours to 48 hours. The drying gases or air should preferably not be materially over 100° C. In a preferred embodiment of the invention the warm or hot air contains less than 5 to 6% of carbon dioxide and preferably contains even less than 1%. The gas may also contain traces of sulphur dioxide. Gases containing between 0.1 and 0.5% carbon dioxide have been found to function satisfactorily. The drying gas should contain much more carbon dioxide than is usually contained in air. Preferably they should contain many fold this amount. In drying the gels, a lower temperature and a longer drying period has been found most desirable. The most satisfactory gel products are produced when the damp or wet material is dried a a temperature of 40 to 50° C. for a period of from 36 to 48 hours. When a gel, which is alkaline with caustic alkali, is dried in this manner, such amount of acidic gases should be utilized as will reduce materially such caustic alkalinity. If the caustic alkalinity is sufficiently reduced, the drying may be carried to bone dryness without crumbling of the product. The dry product should be in such a condition that it may be granulated into particles of desired size by contacting with water. In general, it is desirable not to reduce caustic alkalinity of the product below a point at which the product is still alkaline to phenolphthalein or methyl orange. As a specific example of a satisfactory drying gas, to which the invention is by no means restricted, the following composition is given.

| | Per cent |
|---|---|
| Carbon dioxide | 0. 2– 0. 3 |
| Oxygen | 20. 5–21 |
| Nitrogen | 78 –80 |
| Water vapor | 0. 1– 0. 5 |
| Sulphur dioxide | Trace |

The preferred drying gas of the present invention may be produced in a variety of ways, but it is most economically produced by the purification and dilution of the products of combustion of fuels, especially clean fuels such as oil, gas or coke. The products of combustion of coal may also be utilized, but in such a case, particularly with soft coals, the carrying over of tar or sooty materials should be minimized. If much sulphur dioxide is present in the products of combustion, it is preferable to reduce the time of exposure of the gel to the drying gases, so that the alkalinity of the product will not be reduced below a point at which it will react alkaline to phenolphthalein and methyl orange. In the preferred form of the invention, one volume of the furnace gases or products of combustion is diluted with between 15 and 25 volumes of air. Before or after this dilution, the products of combustion should be purified by passing them through a mechanical filter and/or by washing with a non-aqueous liquid. For example, the gases may be passed through a vessel containing shredded copper covered with a thin layer of a heavy oil.

After the drying is continued to the desired point, the material is removed from the dryer and is washed with water to granulate it and/or to remove any undesirable soluble compounds which have been left therein. The processes above described may be modified in many details. For example, the acidic gases may be introduced intermittently into the drying gas or they may be introduced at various stages of drying process. The concentration of the acidic or other vapor or gaseous chemical reagents may be made to vary widely according to the result desired. If air is utilized as a diluting and carrying agent for the chemical reagent, the humidity of such air may be increased or otherwise modified in order to influence the effectiveness of the gaseous chemical reagents. This is especially the case when acidic gases are utilized since moisture is required from some source to permit an acid to function as such. In the present invention this moisture is supplied for the most part by the material being dried, at least during the greater part of the drying cycle. In certain cases it may be desirable to re-circulate the drying gases to conserve the heat thereof and also the chemical reagents contained therein. However, care must be taken to prevent too great an increase in the moisture content of the drying gases since the rate of drying is decreased when the amount of moisture in the drying gases becomes large.

In the case of waste combustion gases it is not necessary to conserve the heat of the circulating gases, since any heat lost may be replaced by the addition of a fresh portion of the hot combustion gases. In such a case the moisture may be removed from the circulating gases after they have passed through the dryer.

Siliceous gels appear to react most effectively with reagents before they have been dehydrated sufficiently to assume a rigid permanent structure. The reaction with water soluble gaseous reagents, such as carbon dioxide, will take place most effectively when the gel is still soft and when it contains a substantial amount of the mother liquor.

What is claimed is:

1. In the process of producing a siliceous gel-like material, the steps of reacting together solutions of gel-forming reagents in such proportions and at such temperatures and concentrations as to form a gel occupying substantially all of the reaction mixture, so regulating such reaction mixture that it will be alkaline to phenolphthalein, treating the resultant gel without drying so as to remove a substantial portion of its liquid content, breaking up the partially dewatered gel, forming it into layers about 3" or less in thickness, and subjecting the layers of material to the action of gases of 40 to 50° containing small amounts of carbon dioxide in materially greater proportion than is normally contained in air less than 1% and very small traces of sulphur dioxide.

2. In the process of producing a siliceous gel-like material, the steps of reacting together solutions of gel-forming reagents in such proportions and at such temperatures and concentrations as to form a gel occupying a major portion of the reaction mixture, so regulating such reaction mixture that it will be alkaline to methyl orange, subjecting the resultant gel to compression to remove a substantial portion of its uncombined moisture content, breaking up the partially dewatered gel, forming it into layers less than about 4" in thickness, subjecting the layers of material to the action of gases of 40 to 100° C. containing small amounts of acidic gases in materially greater proportion than is normally contained in air, continuing the drying operation until the alkalinity of the gel has been substantially neutralized and then contacting the gel with water to remove any residual soluble products therein.

3. In the process of producing a siliceous gel-like material, the steps of reacting together solutions of the reagents in such proportions and at such temperatures and concentrations as to form a jelly, so regulating such reaction mixture that it will be alkaline, treating the resultant gel without drying to remove a major part of its uncombined moisture content, breaking up the partially dewatered jelly, forming it into layers about 1" in thickness, subjecting the layers of material to the action of hot air containing small amounts of carbon dioxide in materially greater proportion than is normally contained in air less than 1% and very small traces of sulphur dioxide, continuing the drying operation until the alkalinity of the gel has been materially reduced and then contacting the gel with water.

4. In the process of producing a siliceous gel-like material, the steps of reacting together solutions of gel-forming reagents in such proportions and at such temperatures and concentrations as to form an alkaline gel, treating the resultant gel without drying so as to remove a substantial portion of the soluble constituents contained therein, breaking up the partially dewatered gel, forming it into layers, subjecting the layers of material to the action of combustion gases, continuing the drying operation until the alkalinity of the gel has been largely neutralized and stopping the drying operation when the gel is still alkaline to methyl orange.

5. In the process of producing a siliceous gel-like material, the steps of forming a gel, breaking up the gel, forming it into layers, subjecting the layers of material to the action of hot combustion gases in admixture with air, and continuing the drying operation until the gel will granulate upon contact with water.

6. In the process of producing a siliceous gel-like material, the steps of forming a jelly which will be alkaline to phenolphthalein, treating the resultant gel without drying so as to remove a substantial portion of its liquid content and subjecting the jelly to the action of warm gases of 40 to 50° containing small amounts of carbon dioxide for 25 to 48 hours.

7. In the process of producing a siliceous gel-like material, the steps of reacting together solutions of the reagents in such proportions and at such temperatures and concentrations as to form an alkaline jelly and subjecting the jelly to the action of warm gases containing small amounts of gaseous chemical reagents in materially greater proportion than is normally contained in air.

8. In the process of producing a siliceous gel-like material, the steps of forming an alkaline jelly, treating the resultant jelly without drying so as to remove a substantial portion of the soluble constituents contained therein, and subjecting a layer of the material to the action of hot gases containing small amounts of carbon dioxide in materially greater proportion than is normally contained in air less than 1%.

9. In the process of producing a siliceous gel-like material, the steps of forming a gel and subjecting the gel to the action of purified and diluted combustion gases.

10. In the process of producing a siliceous gel-like material, the steps of reacting together solutions of the reagents in such proportions and at such temperatures and concentrations as to form an alkaline jelly occupying a major portion of the reaction mixture, so regulating such reaction mixture that it will be alkaline to phenolphthalein, and subjecting the jelly to the action of hot waste combustion gases which have been diluted with about 20 times their volume of air.

11. In the process of producing a siliceous gel-like material, the steps of forming a gel embracing a substantial portion of the mother liquor and subjecting the gel to drying gases containing chemical reagents in materially greater proportion than is normally contained in air.

12. In the process of producing a siliceous gel-like material, the steps of reacting together solutions of gel-forming reagents, partially dewatering the resultant gel without drying so as to remove a substantial portion of its liquid content, breaking up the partially dewatered gel, forming it into layers about 3″ or less in thickness, subjecting the layers of material to the action of gases of 40 to 50° containing small amounts of carbon dioxide less than 1% and very small traces of sulphur dioxide, and then contacting the gel with water.

13. In the process of producing a siliceous gel-like material, the steps of reacting together solutions of gel-forming reagents, compressing the resultant gel, breaking up the compressed gel, forming it into layers less than about 4″ in thickness, subjecting the layers of material to the action of gases of 40 to 100° C. containing small amounts of acidic gases, and then contacting the gel with water.

14. In the process of producing a siliceous gel-like material, the steps of forming an alkaline siliceous jelly, and treating said jelly with hot gases containing small amounts of carbon dioxide in materially greater proportion than is normally contained in air, said hot gases being at a temperature not substantially over 100° C.

15. In the process of producing a siliceous gel-like material, the steps of forming a wet siliceous gel and subjecting said gel to the action of combustion gases of a temperature between about 40 and 100° C.

16. In the process of producing a siliceous gel-like material, the steps of forming a gel embracing a substantial portion of the mother liquor and subjecting the gel to the action of gases of a temperature between about 40 to 100° C. containing small amounts of gaseous chemical reagents in materially greater proportion than is normally contained in air and large amounts of inert diluents.

17. In the process of producing a siliceous gel-like material, the steps of forming an alkaline jelly and treating the alkaline material with a current of warm gases containing between about 0.1 to 6% of carbon dioxide and the remainder principally inert gases.

18. In the process of producing a siliceous gel-like material, the steps of forming a gel containing a substantial portion of the mother liquor and subjecting the gel to the action of warm purified and diluted combustion gases containing between about 0.1 to 1% of $CO_2$.

19. In the process of producing a siliceous gel-like material, the steps of forming a gel embracing a substantial portion of the mother liquor and subjecting the gel to the action of warm gases containing about 0.1 to 5% of gaseous chemical reagents and the remainder principally an inert gas.

20. A process of drying a gel by the use of air containing from 0.2% to 0.3% of carbon dioxide at temperatures between 40° and 100° C. for 25 to 48 hours.

21. In the process of preparing siliceous gel-like substance, the step of drying the gel-like substance in a current of gases containing appreciable quantities of an acidic constituent.

In testimony whereof I have hereunto subscribed my name.

ABRAHAM SIDNEY BEHRMAN.